May 22, 1951     S. T. WILLIAMS     2,554,478
HOSE CLAMP TOOL
Filed Nov. 13, 1946
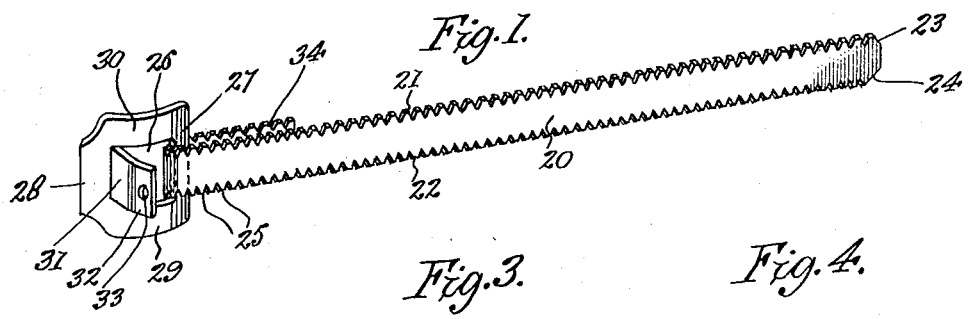
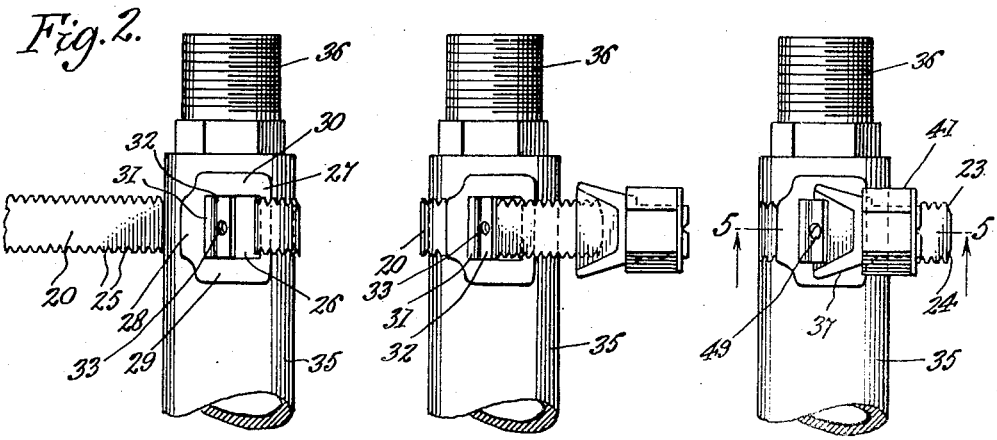
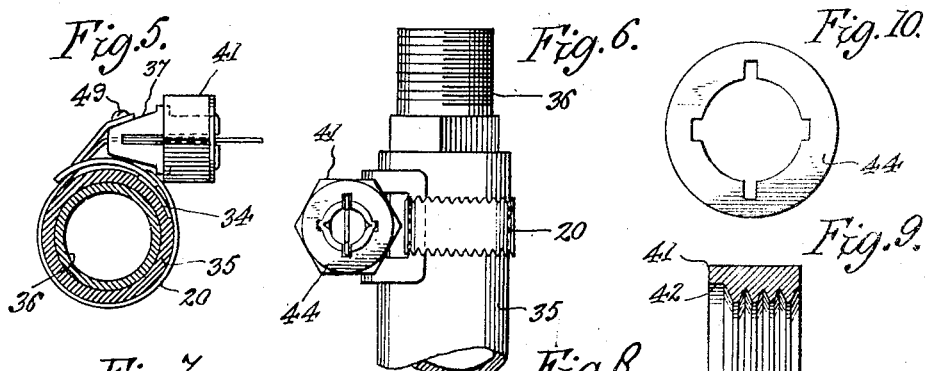
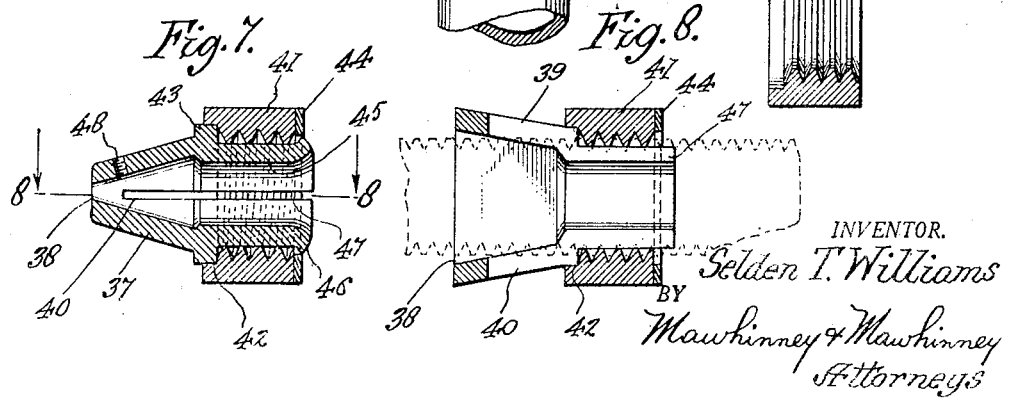
INVENTOR.
Selden T. Williams
BY Mawhinney & Mawhinney
Attorneys Patented May 22, 1951

2,554,478

UNITED STATES PATENT OFFICE 2,554,478

HOSE CLAMP

Selden T. Williams, Bellerose, N. Y., assignor to Scovill Manufacturing Company, Waterbury, Conn., a corporation of Connecticut Application November 13, 1946, Serial No. 709,497

5 Claims. (Cl. 24—19)

The present invention relates to improvements in hose clamps and tool for assembling the same and has for an object to provide an associated hose clamp and tool by which the hose clamp is assembled to the hose and remains as a fixture therewith to the end that the tool may be subsequently utilized by reversing its movements in order to release the clamp and convert it to re-useability.

The present application illustrates and describes for convenience and preference certain features more particularly claimed in my co-pending application filed of even date herewith, Serial No. 709,496 and entitled "Hose Clamp Tool."

Whereas the hose clamp according to the prior application is permanent, irremovable and must be discarded after it is cut away from the hose or coupling and is therefore not re-useable, an object of the present invention is to so associate and construct and arrange the tool that it becomes incorporated as a part of the hose clamp, remains in place on the clamp throughout the entire clamping use of the latter and is available for releasing and opening the hose clamp when it is desired that the hose be disassembled from its nipple or coupling.

The invention also contemplates a certain new and useful modification of the standard buckle to cooperate with parts of the tool in the permanent connection and association of these two members of the invention.

A still further object of the invention is to provide a novel form of tool in which its simply constructed and compact arrangement enable it to become a permanent part of the hose coupling without adding prohibitively to the bulk of the same and without creating such an awkward bulk so as to unfit the hose coupling for installation in close places.

With the foregoing and other objects in view, the invention will be more fully described hereinafter and more particularly pointed out in the appended claims.

In the drawings, in which like parts are denoted by the same reference characters throughout the several views, Figure 1 is a perspective view of an improved hose clamp constructed in accordance with the present invention and shown in a phase of initial assembly.

Figure 2 is a fragmentary top plan view of a nipple and associated hose with the improved clamp applied thereto in a second phase or step of the use of the device.

Figure 3 is a view similar to Figure 2 with the final end of the strap passed through the buckle and in the act of receiving the tool.

Figure 4 is a view similar to Figure 2 with the tool and hose clamp in the final position of assembly on the hose.

Figure 5 is a transverse section taken on the line 5—5 in Figure 4.

Figure 6 is a fragmentary side elevation of the nipple and associated hose showing the hose clamp and tool in end elevation taken from the right end of Figure 5.

Figure 7 is a longitudinal section taken through the improved tool.

Figure 8 is a section taken longitudinally through the tool at substantially right angles to that of Figure 7 and on the line 8—8 of Figure 7.

Figure 9 is a longitudinal section taken through a form of nut employed.

Figure 10 is an end elevation of a form of washer employed.

Referring more particularly to the drawings, 20 designates a thin flat band or strap of metal of a flexible nature which is of substantially uniform width from end to end and has teeth 21 and 22 continuously along both edges throughout the length of the strap, the teeth being arranged in conformity with the helix of a screw thread. The strap 20 may be cut from an indeterminate length of serrated edged stock strip which is afterwards diagonally cut off to provide the tapering ends 23 and 24 which facilitate the entering of the free or final end of the strap into the jaw of the tool as hereinafter described.

The side walls of the teeth 21 and 22 converge outwardly but have truncated apexes to provide flat outer walls 25.

The improved buckle is formed with a slot 26 which is bounded by the lateral bars 27 and 28 and the end bars 29 and 30. The buckle will be given a curvature or bend to agree substantially with the external diameter of the hose to which it is applied as indicated in Figure 5. One of the lateral bars 28 of the buckle carries a tongue having a tangent part 31 and an angled free end 32 pierced by an unthreaded hole 33.

As shown more particularly in Figure 1, the origin or initial end of the strap 20 is entrained with the buckle by passing such end over the outside of the bar 27 thence radially inward through the slot 26 and finally lapping the free end of the strap beneath the lateral bar 27 and along a substanital length of the main portion of the strap extending off the buckle. This underlap is indicated at 34. The hose is represented at 35 and is the usual flexible or resilient hose adapted to be attached to the nipple or coupling member 36.

The improved special tool is shown more particularly in Figures 7 to 10 inclusive and consists generally of a stationary jaw and a rotary nut. The jaw is represented generally at 37 having a flattened nose with convergent walls terminating at a mouth end in which is provided a narrow axial slot 38 of a width to slidably receive the strap 20. The jaw is tubular and formed with side slits 39 and 40 to permit the teeth 21 and 22 to have access to the internal helical thread of the nut 41. An annular recess 42 opening through the forward edge of the nut 41 accommodates a circular shoulder or flange 43 of the jaw 37 to permit rotation of the nut 41 but to restrain axial motion of the nut in a forward direction. The nut rotates upon the tubular tail piece 45 of the jaw which may be upset at 46 outwardly to form an abutment for the rear end of the nut 41 to confine such nut against axial motion. A washer 44 may, if desired, be interposed between such rear end of the nut 41 and the out-turned portions 46 of the sleeve or bearing tube 45. This tube 45 is slitted as indicated at 47 in continuation of the slits 39 and 40 of the jaw. The outside diameter of the bearing tube 45 is approximately the same as the width of the strap 20 minus the width of the teeth 21 and 22 to permit such teeth 21 and 22 to be engaged by the helical internal thread of the nut 41. The walls of the slits 47 will tend to stabilize the strap 20 in its passage through the tool and prevent rotation of the same. The outer wall of of the tapering jaw 37 is provided with a screw socket or hole 48 in which to interlockingly engage a screw 49 which passes through the perforation 33 of the buckle tongue, 31, 32.

In the use of the invention, the initial or origin end of the strap 20 is assembled to the buckle as heretofore described and as shown in Figure 1. The buckle is then applied to the hose 35 as indicated in Figure 2 and the strap 20 wound about such hose with its free or final end, 23, 24 entered beneath the opposite lateral bar 28 of the buckle and brought out radially through the slot 26 as represented in Figure 3.

The length of the strap 20 will be such that an ample final end will project outwardly from the buckle for the entering of the tool thereupon as indicated in Figure 3. The tapering corner portions 23, 24 of such final end facilitate the assembly of such strap end to and through the narrow axial slot 38 of the jaw 37 and into engagement with the nut 41. The assembly of the tool onto the free final end of the strap will tend to hold the jaw 37 and its bearing tube 45 against rotation but such jaw may be held in one hand while the nut 41 is rotated by the other hand to feed the tool along the strap from the position shown in Figure 3 to that shown in Figure 4. In the latter figure the inner tapering wall of the jaw 37 is shown to have moved into a seat upon the buckle while the outer tapering jaw has entered within the outer angled portion 32 of the buckle tongue which is preferably of the same rigid metal as the buckle. It will be noted particularly from Figure 5 that the blunt free end of the jaw 37 abuts against the internal elbow or corner portion between the tongue members 31 and 32 and that the tongue and the side bars 29 and 30 of the buckle cooperate in creating a stop and an abutment for the tool to prevent its further motion in a direction to the left as indicated in Figure 5. In this position further rotation of the nut 41 in a direction to feed the strap through the tool has the effect to tighten and constrict the strap about the hose 35 inasmuch as the tool now held stationary will pull the free or final end of the strap 20 through the tool and through the buckle slot 26 while the other end 34 of the strap is anchored firmly in place by the pressure of the external portion of the strap 20 which overlies the initial end 34 and also by the pressure of the lateral bar 27 of the buckle. Moreover, the lateral teeth 21 and 22 of the underlap 34 and of other portions of the strap will tend to bite into the body material of the hose 35 particularly as the band is drawn tighter so as to squeeze the included part of the hose and cause bulges of the hose material at opposite side edges of the strap 20. Thus the hose clamp will be prevented from creeping axially along the hose 35.

Before the clamp is tightened, the set screw 49 is inserted through the hole 33 and rotated into the socket 48 of the jaw 37 to permanently connect the tool with the hose clamp. If desired before this is done and to give clearance for the operation, the original end 34 of the strip may be looped through the buckle.

Whenever it is desired to release and remove the clamp, the nut 41 may be rotated in a reverse direction, and the set screw 49 having been removed the tool may be backed or walked off the free end of the strap 20. The buckle may then be pried away from the hose and slipped over such free end of the strap.

Any excess of strap material projecting beyond the tool in its final position, as for instance indicated in Figure 5, may be either left in place or cut off as desired.

I have illustrated and described herein only one mechanical embodiment which is the best mechanical form known to me at this time, but I wish it to be understood that the invention is susceptible of embodiment in other mechanical forms and I reserve the right to make such changes and modifications as fairly come within the scope of the following claims.

I claim:

1. In a hose clamp, a buckle having a slot therein with lateral bars at opposite sides of said slot and end bars connecting said lateral bars across ends of the slot and an abutment projecting outwardly from one of the lateral bars, a strap having an initial end lapped about the other lateral bar and after being passed about the hose having its final end inserted from the inside out through the slot in the buckle within said abutment, said strap having helical teeth on its edges, a strap tightening unit separate from said buckle and comprising a stationary jaw and a nut rotatable on said jaw but restrained against axial movement relative to the jaw, said jaw having a narrow axial mouth and side slits to receive therethrough the free end of said strap with the toothed edges of the strap engaging the thread of the nut for initially entraining the unit with the free end of the strap and then causing the unit to be fed along the free end of the strap until said jaw encounters said buckle and its abutment and to thereupon feed the free end of the strap through the unit to constrict the strap about the hose.

2. A hose clamp as claimed in claim 1 characterized by the fact that detachable means couple the unit and abutment together to prevent the unit backing off the buckle.

3. A hose clamp as claimed in claim 1 characterized by the fact that the jaw has tapering inner and outer external walls to fit between the buckle and abutment.

4. A hose clamp according to claim 1 characterized by the fact that said buckle has its end bars struck on an arc with the abutment substantially tangential thereto, said abutment having an angular free end, said jaw having outwardly convergent inner and outer external walls with the inner wall adapted to rest against the buckle and the outer wall lying within the angle end of the abutment.

5. A hose clamp according to claim 1 characterized by the fact that said abutment partially overlies the slot in the buckle and has an angled free end bent toward the buckle, said jaw having outwardly convergent inner and outer external walls with the inner wall adapted to engage the end bars of the buckle and the outer wall engaging within the angled end of the abutment, and a detachable fastening between the angled end of the abutment and said jaw for temporarily securing the unit to the buckle.

SELDEN T. WILLIAMS.

REFERENCES CITED

The following references are of record in the file of this patent:

UNITED STATES PATENTS

| Number | Name | Date |
|---|---|---|
| 130,032 | Fautz | July 30, 1872 |
| 1,219,273 | Elkin | Mar. 13, 1917 |
| 1,481,674 | Barnes | Jan. 22, 1924 |
| 1,514,411 | Wilkinson | Nov. 4, 1924 |
| 1,557,718 | Malleville | Oct. 20, 1925 |
| 1,785,550 | Hansen | Dec. 16, 1930 |
| 2,389,785 | King | Nov. 27, 1945 |

FOREIGN PATENTS

| Number | Country | Date |
|---|---|---|
| 544,491 | Great Britain | Apr. 15, 1942 |